(12) United States Patent
Chainer et al.

(10) Patent No.: US 11,145,142 B2
(45) Date of Patent: Oct. 12, 2021

(54) DETECTION OF ROAD SURFACE DEFECTS

(71) Applicant: INTERNATIONAL BUSINESS MACHINES CORPORATION, Armonk, NY (US)

(72) Inventors: Timothy J. Chainer, Putnam Valley, NY (US); Pritish R. Parida, Fishkill, NY (US); Marc A. Taubenblatt, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 15/257,857

(22) Filed: Sep. 6, 2016

(65) Prior Publication Data
US 2018/0068495 A1     Mar. 8, 2018

(51) Int. Cl.
    *G07C 5/00*        (2006.01)
    *B60W 40/06*     (2012.01)

(52) U.S. Cl.
    CPC ............ *G07C 5/008* (2013.01); *B60W 40/06* (2013.01); *B60W 2520/10* (2013.01);
(Continued)

(58) Field of Classification Search
    CPC .... G07C 5/008; B62D 15/02; B60R 16/0232; B60R 11/04; B60C 23/02;
(Continued)

(56) References Cited

U.S. PATENT DOCUMENTS 5,267,466 A * 12/1993 Morris ............... B60G 17/0185
                                          280/6.157
5,586,028 A * 12/1996 Sekine ................ B60T 8/17636
                                              701/1
(Continued)

FOREIGN PATENT DOCUMENTS

DE     102015010576 A1 * 3/2016 ............ B60W 40/06
EP           1273496 A2 * 1/2003 ......... B60G 17/0165

OTHER PUBLICATIONS

Cohn, AI. "Understanding—and Coaching Fleets—About Tires and Inflation Pressure." Tire Review. http://www.tirereview.com/understanding-and-coaching-fleets-about-tires-and-inflation-pressure/. Archived by Archive.org on Aug. 5, 2014. (Year: 2014).*

(Continued)

*Primary Examiner* — Jeffrey C Boomer
(74) *Attorney, Agent, or Firm* — Intelletek Law Group, PLLC; Gabriel Daniel, Esq.

(57) ABSTRACT

A method of detecting and identifying road surface defects is provided. Motion and position information is received from a plurality of vehicles. A profile is retrieved for a particular vehicle from a database of vehicle profiles by using an identifier of the particular vehicle. One or more criteria are identified for detecting a particular type of road surface defect based on the retrieved profile of the particular vehicle. Upon determining that the received motion and position data satisfies the identified criteria, a detection of a road surface defect of the particular type and a location associated with the detected road surface defect based on the received position information is reported.

20 Claims, 11 Drawing Sheets

(52) U.S. Cl.
CPC ... *B60W 2520/105* (2013.01); *B60W 2530/10* (2013.01); *B60W 2530/20* (2013.01); *B60W 2556/50* (2020.02); *B60W 2756/10* (2020.02)

(58) Field of Classification Search
CPC ......... G08G 1/096855; G08G 1/09626; G08G 1/0967; B60W 40/06; B60W 2556/50; B60W 2756/10; B60W 2520/10; B60W 2530/10; B60W 2530/20; B60W 2520/105

See application file for complete search history.

(56) References Cited

U.S. PATENT DOCUMENTS

| | | | |
|---|---|---|---|
| 6,385,525 B2 | 5/2002 | Watanabe et al. | |
| 6,577,943 B2 | 6/2003 | Nakao et al. | |
| 8,055,424 B2 | 11/2011 | Salman et al. | |
| 8,451,140 B2 | 5/2013 | Piccinini et al. | |
| 8,880,323 B2 | 11/2014 | Jain et al. | |
| 9,108,640 B2 | 8/2015 | Jackson | |
| 9,170,102 B2 | 10/2015 | Hanatsuka et al. | |
| 9,378,602 B2* | 6/2016 | Ricci | H04W 4/21 |
| 2003/0236606 A1* | 12/2003 | Lu | B60G 17/0162 701/70 |
| 2004/0122580 A1* | 6/2004 | Sorrells | G07C 5/008 701/80 |
| 2008/0162009 A1* | 7/2008 | Miki | B60G 7/006 701/80 |
| 2008/0243334 A1* | 10/2008 | Bujak | B60G 17/0165 701/37 |
| 2009/0164063 A1 | 6/2009 | Piccinini et al. | |
| 2010/0256903 A1* | 10/2010 | Johnson | G01C 21/32 701/533 |
| 2011/0200199 A1* | 8/2011 | Wakao | B60T 8/172 381/56 |
| 2012/0203428 A1* | 8/2012 | Choi | B60G 17/016 701/37 |
| 2012/0218411 A1 | 8/2012 | Wu et al. | |
| 2013/0018575 A1* | 1/2013 | Birken | G01B 11/2513 701/409 |
| 2013/0155061 A1* | 6/2013 | Jahanshahi | G06T 15/00 345/419 |
| 2014/0114547 A1* | 4/2014 | Chimner | B60T 8/172 701/73 |
| 2014/0195112 A1* | 7/2014 | Lu | B60G 17/015 701/37 |
| 2014/0278038 A1* | 9/2014 | Stankoulov | G01C 21/3469 701/123 |
| 2014/0355589 A1 | 12/2014 | Yang et al. | |
| 2015/0336546 A1 | 11/2015 | Al-Zahrani | |
| 2015/0371095 A1 | 12/2015 | Hartmann et al. | |
| 2016/0042644 A1* | 2/2016 | Velusamy | H04W 4/70 340/435 |
| 2016/0236689 A1* | 8/2016 | Pettersson | B60W 40/06 |
| 2016/0280224 A1* | 9/2016 | Tatourian | B60W 30/143 |
| 2016/0284138 A1* | 9/2016 | Adderly | G07C 5/006 |
| 2016/0292518 A1* | 10/2016 | Banitt | G06K 9/00805 |
| 2017/0129491 A1* | 5/2017 | Tatourian | B60W 30/188 |
| 2017/0166215 A1* | 6/2017 | Rander | G01C 21/3453 |
| 2017/0243370 A1* | 8/2017 | Hoye | G06T 7/73 |
| 2017/0301207 A1* | 10/2017 | Davis | G08B 21/043 |
| 2017/0334450 A1* | 11/2017 | Shiraishi | B60W 50/08 |
| 2018/0001871 A1* | 1/2018 | Steward | B60S 1/0822 |
| 2018/0022278 A1* | 1/2018 | Parat | B60R 1/002 |

OTHER PUBLICATIONS

Translation of DE102015010576A1. Obtained via ESPACENET on Jun. 22, 2018. (Year: 2015).*

Translation of EP1273496A2. Obtained via ESPACENET on Jun. 22, 2018. (Year: 2003).*

Jang et al., "Road Surface Condition Monitoring Via Multiple Sensor-Equipped Vehicles," 2015 IEEE INFOCOM, Hong Kong, Apr. 26-May 1, 2015.

Li et al., "Road Anomaly Estimation: Model Based Pothole Detection," 2015 American Control Conference, Chicago, Illinois, US, Jul. 1-13, 2015.

Madli et al., "Automatic Detection and Notification of Potholes and Humps on Roads to Aid Drivers," IEEE Sensors Journal, vol. 15, No. 8, pp. 4313-4318, Aug. 2015.

* cited by examiner

DETECTION OF ROAD SURFACE DEFECTS

BACKGROUND

Technical Field

The present disclosure generally relates to methods and systems for determining road conditions using sensor information and providing alerts to nearby drivers. More specifically, the present disclosure relates to using sensor data available to a vehicle to detect road surface defects.

Description of the Related Art

Cloud computing and storage solutions provide users with various capabilities to store and process their data in data centers that may be located far from the user. Cloud computing makes it possible for data collected by multiple different mobile devices to be centrally processed at a data center for the purpose of generating value added information for subscribers.

SUMMARY

In some embodiments, a data center receives motion and position information from a plurality of vehicles. A profile is retrieved for a particular vehicle from a database of vehicle profiles by using an identifier of the particular vehicle. The data center identifies one or more criteria for detecting a particular type of road surface defect based on the retrieved profile of the particular vehicle. Upon determining that the received motion and position data satisfies the identified criteria, the data center reports a detection of a road surface defect of the particular type and a location associated with the detected road surface defect based on the received position information.

In some embodiments, a vehicle collects data from a set of sensors of the vehicle. The vehicle retrieves a profile of the vehicle and identifies one or more criteria for detecting a particular type road surface defect based on the retrieved profile of the vehicle. Upon determining that a collected sensor data satisfies the one or more identified criteria, the vehicle activates a video camera in the vehicle for recording images of the road.

Some embodiments of the disclosure provide a computing device that includes a processor, a network interface, and a storage device coupled to the processor. The storage device stores a set of instructions. The execution of the set of instructions by the processor configures the computing device to collect data from a set of sensors of a vehicle, retrieve a profile for the vehicle, and identify one or more criteria for detecting a particular type road surface defect based on the retrieved profile of the vehicle. The set of instructions also configures the processor to report to a datacenter a detection of a road surface defect of the particular type and a location associated with the detected road surface defect based on the received position information upon determining that the collected sensor data satisfies identified criteria.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Some embodiments of the disclosure provide a cloud detection system for identifying vehicle-encountered events by monitoring vehicle sensor information. The cloud detection system detects and identifies road surface defects encountered by vehicles. In some embodiments, the cloud detection system utilizes on board vehicle sensors including vehicle accelerometers and tire pressure monitors to detect the condition of road surfaces by correlating that information with the vehicle GPS location and time stamp.

In some embodiments, the system for detecting and identifying a road defect comprises a wireless communications link between traveling vehicles and a Cloud Data Center. The vehicle identifier information, location, time, speed, acceleration and tire pressure are transmitted to a Cloud Data Center via the wireless communications link. In some embodiments, the data from more than one vehicle are processed to create a temporal and spatial map of the vehicle acceleration and tire pressure data.

In some embodiments, the speed, acceleration and tire pressure data are processed to determine a correlation between variations in the vehicle acceleration and tire pressure to create a road defect event metric. For example, a simultaneous spike in the vehicle acceleration change and individual tire pressure would indicate the vehicle tire encountered a pothole. One or more tires experiencing a spike in tire pressure would indicate that more than one tire encountered a pothole.

In some embodiments, threshold levels are applied to the magnitude of the detected road defect events and to the number of detected road defect events to determine the type of road defect (e.g., whether the road defect is an obstruction or a pothole) encountered by vehicles traveling the roads. Information is communicated regarding the detected road defects to vehicles approaching the road defect. A notification may be generated to a service agency (such as repair crews) for fixing the detected road defect.

Figure 1:
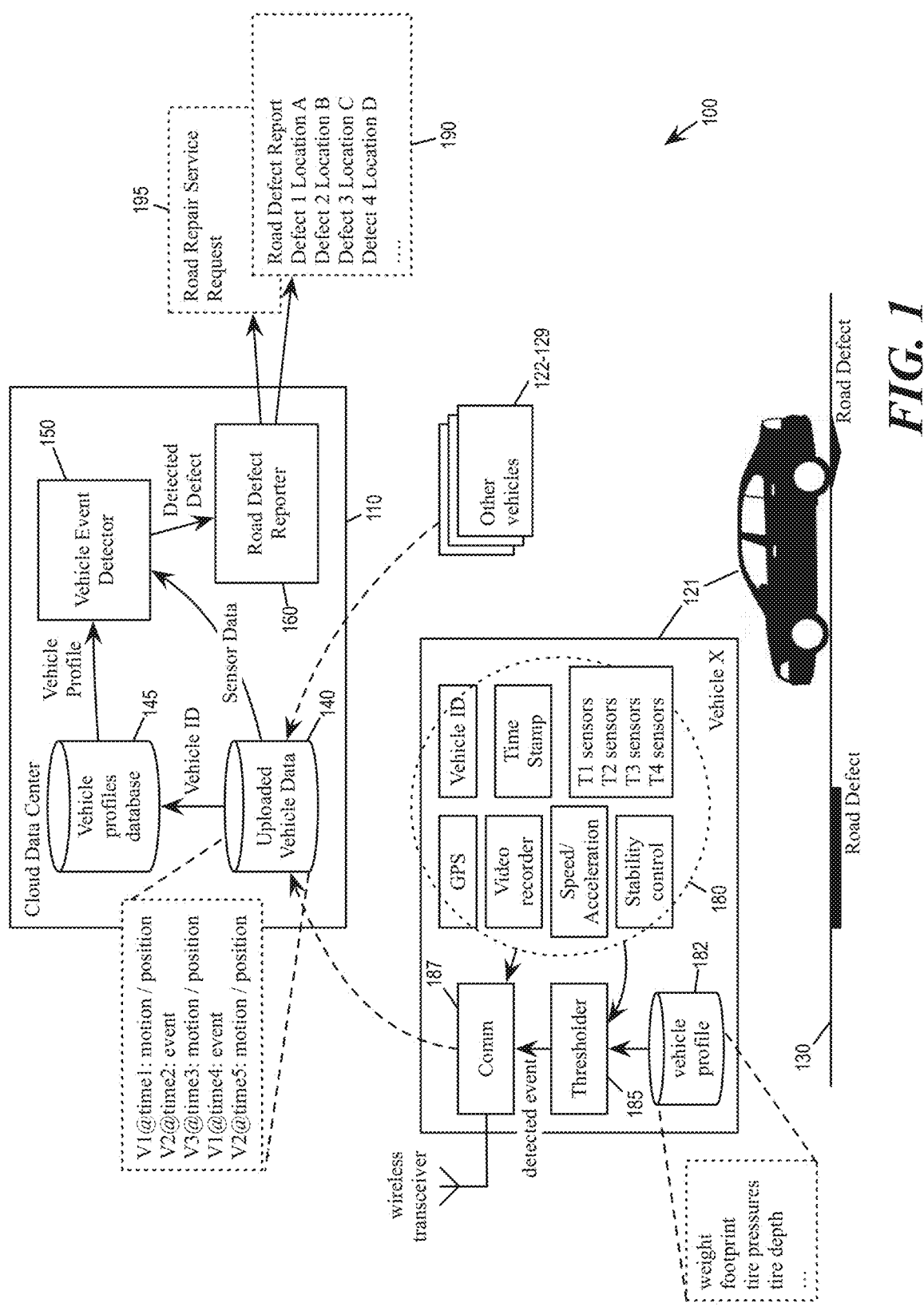
FIG. 1 illustrates a cloud detection system for detecting and identifying a road defect based on information uploaded by vehicles traveling on roads.

FIG. 1 illustrates a cloud detection system 100 for detecting and identifying a road defect based on information uploaded by vehicles traveling on roads. The system 100 comprises a cloud datacenter 110 that receives sensor data from vehicles 121-129. By analyzing the received sensor data from the vehicles, the cloud datacenter 110 identifies road defects and generates a report 190 about the identified road defects. As illustrated, the vehicle 121 is traveling on a particular road 130, which has several surface defects. The vehicle 110 is equipped with a set of sensors, which produce sensor data that reflect the effect of the road surface defect on the vehicle. The vehicle 121 uploads the sensor data to the cloud datacenter 110, which uses the uploaded data to identify or detect road surface defects on the road 130.

The vehicles 121-129 are mobile units that can move about from one place to another, and can travel to different places at different times. Such a mobile unit can be an automobile, a motorcycle, a mobile device carried by a pedestrian, or any other moving object or apparatus. In some embodiments, each mobile unit includes or carries equipment or devices that allows the mobile unit or vehicle to become part of the cloud detection system 100. In some embodiments, the vehicle equipment can include sensors that are physically attached to the vehicle. The vehicle's equipment can also include sensors that are provided by one or more independent mobile devices (such as a smart phone) that are carried aboard the vehicle by its operator/driver (or in the pocket of a pedestrian).

The vehicle's equipment includes sensors 180 for capturing position and motion information regarding the vehicle. The position information is data for identifying the location/position of the vehicle at different moments in time. The motion information is data for describing the motion of the vehicle at different moments in time. As illustrated in FIG. 1, the vehicle 121 includes sensors such as GPS, accelerometer, speedometer, tire/wheel sensors etc. The vehicle's equipment may also include other sensors not illustrated, such as sensors for airbag, video recorder, brake, steering, stability control, etc. In some embodiments, devices physically attached to the vehicle provide some of the sensors, such as GPS, airbag, brake, accelerometer, etc. Independent devices carried aboard the vehicle may also provide some of the sensors, such as GPS, speedometer, and accelerometer. In some embodiments, different vehicles have different types of sensors, and some types of sensors are present in some vehicle but not in others.

In some embodiments, the GPS of a vehicle provides global positioning coordinates that can be used to derive position information and/or motion information. Equipment such as video recorder may also provide position information that can be used to identify the location of the vehicle. Output from sensors such as accelerometer, speedometer, video recorder, brake sensor, and/or tire pressure are used as motion information of the vehicle. Records of emergency equipment deployment such as airbag deployment may also be considered as motion information because they are indicative of sudden change in motion (sudden acceleration or deceleration) of the vehicle.

In some embodiments, the vehicle is equipped with several sets of sensors for the several tires/wheels of the vehicle (T1-T4 sensors). Each tire/wheel has its corresponding set of sensors that report the air pressure of the tire, as well as the (angular) acceleration and velocity of the wheel. A vehicle reports different sets of sensor data for different tires/wheels, and the difference of the sensor data reported for the different tires/wheels are used for identifying road defects.

The tires on a vehicle contact the road surface and provides the mechanical interface between the vehicle and the road. Changes in tire pressure occur when a tire experiences forces that deform the tire such as when the vehicle encounters a pothole. In extreme cases the tire may rupture and there is dramatic loss of tire pressure. In some embodiments, some vehicles are equipped with a Tire Pressure Monitor System (TPMS) that monitors the tire pressure at a rate of 40 times per second to detect both short term variation in tire pressure as well as long term changes.

In some embodiments, a vehicle is equipped with one or more video cameras for recording images of the road surface. Such video cameras are triggered by events encountered by the vehicle, such as road surface defects or a collision. For example, some embodiments trigger the on-vehicle video camera by monitoring tire pressures. This event detection video recording reduces the amount of video data used by activating video surveillance only when a road defect such as pothole is detected. For a vehicle having a video camera placed at the front, pre-trigger recording is deployed to "look back" in time at the data when the vehicle encountered the pothole. For a vehicle having a video camera placed at the rear bumper, video recording is trigger when the first tire of the vehicle encounters the pothole. In one embodiment, the vehicle uploads such video to cloud data center as soon as a road surface defect is detected. In another embodiment, the cloud data center retrieves the video from the vehicle only when the cloud datacenter determines that the vehicle has encountered a road surface defect.

In some embodiments, the vehicle's equipment includes time-stamping mechanisms such that each recorded set of position and/or motion information produced by the sensors is associated with a timestamp. The vehicle's equipment may also includes vehicle identification reporting mechanism such that the cloud datacenter 110 can associate the uploaded sensor data with an identity of the vehicle uploading the data. The vehicle may also report other information specific to the vehicle, such as its weight, its footprint (i.e., wheel/tire positions), its nominal tire pressure, etc. In some embodiments, the weight reported by a vehicle includes the weight of the passengers and cargo aboard the vehicle.

The vehicle 121 is also equipped with a thresholder 185 for locally (i.e., at the vehicle) determining whether the sensor readings 180 meet certain criteria for event detection. The thresholder 185 performs event detection by considering the characteristics of the vehicle, such as its weight, its tire pressures, its tire positions, etc. Some of the detected events are communicated to the cloud datacenter 110. Some of the detected events are used as triggers for certain operations at the vehicle, such as activating video cameras. The event detection at a vehicle will be described further by reference to FIG. 2 below.

The vehicle's equipment also includes communications device 187 for communicating with and to transmit information to the cloud datacenter 110. Each vehicle's communications capability allows the vehicle to upload its captured motion and position data, as well as its detected events, to the cloud datacenter 110 through one or more communications mediums. In some embodiments, such communications are conducted wirelessly through wireless communications medium such as Wi-Fi or wireless phone networks. The wirelessly communicated data are relayed to the cloud datacenter 110 through networks of wired and/or wireless communications mediums such as Ethernet cables, CATV cables, or fiber optics cables. In some embodiments, some of the communications mediums linking the vehicles 121-129 and the cloud datacenter 110 is part of the Internet, and the motion and position information communicated to the cloud datacenter, are conducted through Internet traffic. Each vehicle's communications capability may also allows the vehicle to download or receive various data or report, such as those regarding other vehicles or conditions on the road and present them to the operator of the vehicle through a display.

The cloud datacenter 110 is a system that monitors the vehicles 121-129, detects events such as collision or encounters with road surface defects, and generates reports of the detected events. It receives, through a network interface, the upload of the position and motion information from the vehicles 121-129 and analyzes the received information to detect events such as encounters with road surface defects. In some embodiments, the data uploaded from the vehicles also includes events and triggers detected by vehicles 121-129.

In some embodiments, the cloud datacenter 110 is a computing device or a collection of computing devices that are capable of receiving upload data from the vehicles through the Internet or other communications mediums. Such computing device(s) may situate at a data center or an Internet service provider. Such computing devices may be provided or maintained by a provider of Internet content (e.g., a traffic information server). In some embodiments, the cloud datacenter is a collection of devices that are situated at different physical locations interconnected by the Internet or the computing cloud to perform the operations of the cloud datacenter 110.

As illustrated, the cloud datacenter 110 receives uploads of position and motion information (or sensor data) from the vehicles 121-129 and stores the uploaded information at a vehicle data storage 140. As illustrated, the storage 140 contains sets of uploaded motion and position information from different vehicles. Each set of motion and position information is associated with a vehicle identifier for identifying the vehicle that uploaded the set of information. Each set of motion and position information is also associated with a time stamp for identifying a point in time at which the vehicle is having the position and motion described by the set of position and motion information.

Based on the uploaded position and motion information in the storage 140, the cloud datacenter 110 performs vehicle event detection (illustrated as a vehicle event detector module 150) and road defect reporting (illustrated as a road surface defect reporter module 160) based on the uploaded data at the storage 140. Each detected event causes the cloud datacenter to generate a report such as the report 190, which reports the detected road surface defects. Such report may include the location of the road surface defect, the type of road surface defect, and other information such as video or photographs of the defect (which may be uploaded from the vehicles). The content of the report is then provided to subscribers (such as the vehicles 121-129) to provide traffic information, warnings of road hazard, and other types of notifications. The cloud datacenter 110 also generates repair requests 195 to road repair crews notifying them of the location and type of the road surface defects.

In some embodiments, upon encountering a road surface defect the sensor data of a vehicle reflect the characteristics of the defect as well as the characteristics of a vehicle. For example, upon encountering a pothole, a heavier vehicle would experience a smaller spike in tire pressure than a lighter vehicle, and vehicles with a longer footprint would see a longer delay between tire pressure spikes than vehicles with a shorter footprint. Some embodiments use the number of times a pothole is encountered for each of the tires on a vehicle (e.g., 2 for motorcycles, 3 for wheeler motorcycles, 4 for automobiles, and 6 or more for trucks) to obtain information on the pothole dimensions. The profile of the vehicle is factored in when determining whether a vehicle has encountered a road surface defect. For some embodiments, a vehicle's profile describes or lists a set of characteristics of the vehicle, specifically characteristics that can affect the sensor data relevant for road surface defect detection. Such parameters of a vehicle can include the following: the weight of the vehicle, the nominal tire pressure of each tire, the radius of each tire, the depth of each tire, and the footprint (i.e., the position of each tire/wheel) of the vehicle, among others.

Some embodiments include characteristics into the vehicle profile such as the design of the suspension system, chassis design, vehicle size and mass, number of tires, tire size, and tire pressure, which affect the mechanical response of a vehicle when it encounters a road defect. For example, magnetic ride control of GM® dynamically changes the shock absorber stiffness based upon road conditions, which may affect the response (and hence the sensor readings) of the vehicle upon encountering a road defect. As another example, low profile high performance tires with a narrow sidewall has a different response to road defects than typical all season radial tires.

In some embodiments, the analysis of sensor data for road surface defect detection is based on vehicle characteristics as described above. In some embodiments, both the cloud datacenter and the vehicles participating in the cloud detection system perform analysis of vehicle sensor data based on vehicle profiles. As illustrated in FIG. 1, the vehicle 121 perform its analysis of its own sensor data based on its own vehicle profile 182, while the vehicle event detector 150 at the cloud datacenter 110 perform its analysis of the uploaded sensor data based on the vehicle profiles stored in a video profile database 145.

In some embodiments, the cloud detection system is capable of identifying several different types of road surface defects based on uploaded sensor data. These road surface defects can include potholes, bumps, ice, snow, flood, or other forms of obstruction and road hazards. The cloud detection system use different algorithms to detect different types of surface defects based on different sets of uploaded sensor data. For example, in one embodiment, the system identifies potholes based on spikes in tire pressure and vehicle acceleration. In one embodiment, the system identifies slippery conditions of ice or flood by monitoring differences in speeds and acceleration between the different tires. The system detects road surface defects that cause the vehicle to fail to move in the direction of the steering (e.g., due to hydroplaning) by examining data from steering system and/or stability control system (in addition to other motion and position data) to detect attempts by the stability control system to correct for the slippery condition.

In some embodiments, the cloud detection system uses tire pressure readings from TPMS in combination with other vehicle sensors for identifying road surface defects. For example, accelerometers mounted on the car frame are used to simultaneously measure the force of impact of the pothole on the vehicle structure and/or steering component linkages. In some embodiments, acceleration is measured along six degrees of freedom when a vehicle encounters a road obstruction. One or more subcomponents of the measurements (e.g., the acceleration in x, y, and z directions) are used to determine a direction and magnitude of the force on the vehicle. In some embodiments, a model for the vehicle is used to set a threshold on the determined force for detecting road surface defect.

In some embodiments, the cloud detection system detects road surface defects by monitoring changes in sensor readings that may be caused by damages done to the vehicle by the road surface defects. For example, the cloud detection system uses data from the accelerometers before and after an impact with a road defect to detect the road defect, because the impact of a road surface defect such as a pothole or a bump may be sufficient to bend the wheel rims to result in an imbalance of the tires during rotation. By monitoring the vibration of the vehicle at the frequency of the tire rotation, the cloud detection system detects potholes or bumps by comparing tire imbalances before and after the tire encounters a pothole. As another example, road defect may cause damages to steering linkage. Such damage, and hence the road defect that caused it, could be detected by measuring the "pull" of the car when the steering is at a neutral position.

The cloud detection system 100 is for detecting and reporting various road surface defects by analyzing motion and position data captured by various sensors aboard the vehicles by employing the techniques described above. In some embodiments, some of the analysis is done locally at the vehicles at e.g., the thresholder 185, while some of the analysis is done centrally at the cloud datacenter 110 at e.g., the vehicle event detector 150. The analysis of sensor data performed by the cloud center is based on raw sensor data uploaded by the vehicles in the system. The analysis of the sensor data performed by the cloud center 110 may also be at least partially based on analysis performed at the vehicles. In some embodiments, the results of the analysis performed by the vehicles are uploaded to the cloud datacenter as detected events and triggers. Some of the vehicle-detected events are reported directly as detected road surface defects, while some of the vehicle-detected events are used as inputs for further analysis at the cloud datacenter 110. The analysis of sensor data at a vehicle is described by reference to FIG. 2 below. The analysis of sensor data at the cloud datacenter is described by reference to FIG. 3 below.

Figure 2:
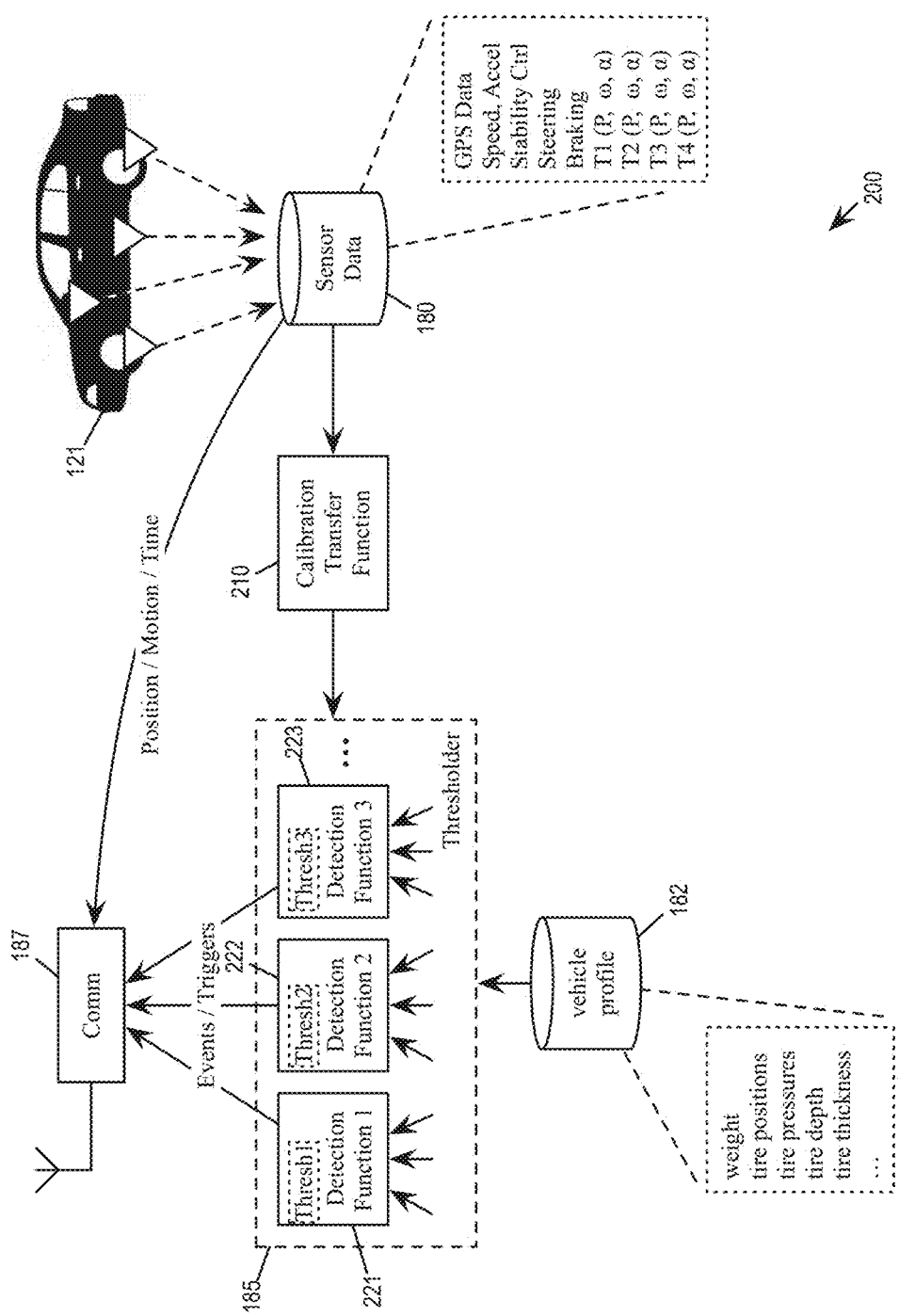
FIG. 2 illustrates the analysis of sensor data performed locally at a vehicle for detecting road surface defects.

FIG. 2 illustrates the analysis of sensor data performed locally at a vehicle for detecting road surface defects. The vehicle 121 includes a road surface monitoring system 200 that uses the motion and position data collected from various sensors of the vehicle 121 to detect road surface defects encountered by the vehicle 121. As illustrated, the sensors of the vehicle 121 produces sensor data 180, which are transmitted/uploaded to the cloud datacenter 110 by the communications device 187 of the vehicle. The road surface monitoring system 200 of the vehicle 121 also includes the thresholder 185, the vehicle profile 182, and a sensor data calibrator 210.

The vehicle profile 182 records information specific to the vehicle 121. The information includes the weight of the vehicle, the tire positions of the vehicle (footprint), average/nominal tire pressures of the vehicle, tire dimensions (such as depth and thickness), as well as other information, such as the type of the suspension system. This information is provided to the thresholder 185 for calculating the thresholds or ranges for detecting various road conditions or events.

The thresholder 185 is configured to determine whether the data collected from various sensors of the vehicle meets (or is within thresholds of) certain criteria. Such criteria may require the sensor data or the outputs of functions based on the sensor data to meet a threshold value or to be within a threshold range of a target value. Some of these criteria are for detecting road surface defect events. Some of these criteria are for triggering certain operations within the vehicle, such as activating recording function of the vehicle's cameras. In one embodiment, the criteria for detecting a road surface defect is obtained by applying a model of the type of defect as well as a model of the vehicle (based on the vehicle's profile). In another embodiment, the criteria for detecting a particular type of road defect for the vehicle type is obtained by computing a set of predicted sensor output for when the vehicle encounters the particular type of road defect.

As illustrated, the thresholder 185 includes several detection modules or functions 221-223. Different detection functions use different sets of inputs from the sensor data 180 and/or from the vehicle profile 182. For example, a detection function for identifying potholes may use speed data, accelerometer data, and TPMS sensors readings, as well as weight and tire dimensions from the vehicle profiles, to determine if the vehicle 121 has encountered a pothole. The detection function for a pothole in some embodiments monitors TPMS sensor readings for tire pressure spikes that exceed a certain threshold value, where the threshold value is determined by the vehicle's weight and tire dimensions (which are part of the vehicle's profile). In another example, a detection function for identifying potholes and bumps based on a vibration imbalance caused by damages due to road surface defects has a detection function that monitors tire vibration. Such a detection function reports detection of potholes upon determining that the tire vibration has an experienced a sudden change, e.g., a change in vibration that is greater than a threshold magnitude within a predetermined period. Similarly, a detection function for identifying potholes and bumps based on a steering misalignment, which may be caused by damages due to road surface defects, have a detection function that monitors steering alignment. Such detection function reports the detection of a pothole or bump upon determining that the steering has an experienced a change, e.g., from going straight to pulling right when in neutral.

The calibrator 210 is configured to calibrate the sensor data and forward the calibrated data to the thresholder 185 for analysis and detection. The true characteristics of a vehicle may deviate from what is specified in the vehicle profile 182. The deviation from what is specified in the vehicle profile can be due to manufacturing variation, but also due to damages inflicted upon the vehicle, which may alter a vehicle's response (i.e., sensor data) to road defects. In some embodiments, a vehicle participating in the cloud detection system calibrates the vehicle's response to road defects by utilizing features in the road. For example, the vehicle utilizes road features such as audible road warnings that are placed in the road and on shoulders of the road. These features are designed into the road surface at certain spatial frequencies to produce acoustic sounds as the tires move over them. As the vehicle rides over these features, a transfer function for the vehicle is computed by measuring the vehicle's velocity and acceleration. The computed transfer function of the vehicle is used to calibrate the vehicle's response (i.e., sensor readings) to the road defects. The calibrator 180 applies computed the transfer function to normalize the vehicle response to cancel the effect of the vehicle's peculiarities from on the sensor data.

The communications module 187 is configured to send data from the vehicle 121 to the cloud datacenter 110 through wireless mediums and the Internet. As illustrated, events detected by the thresholder 185 are delivered to the communications module 187 for transmission to the cloud datacenter 110. In addition, some of the sensor data 180 are also delivered to the communications module 187, including GPS data and time stamps. The communication module 187 in turn associates the collected sensor data or the detected events with position and time.

Figure 3:
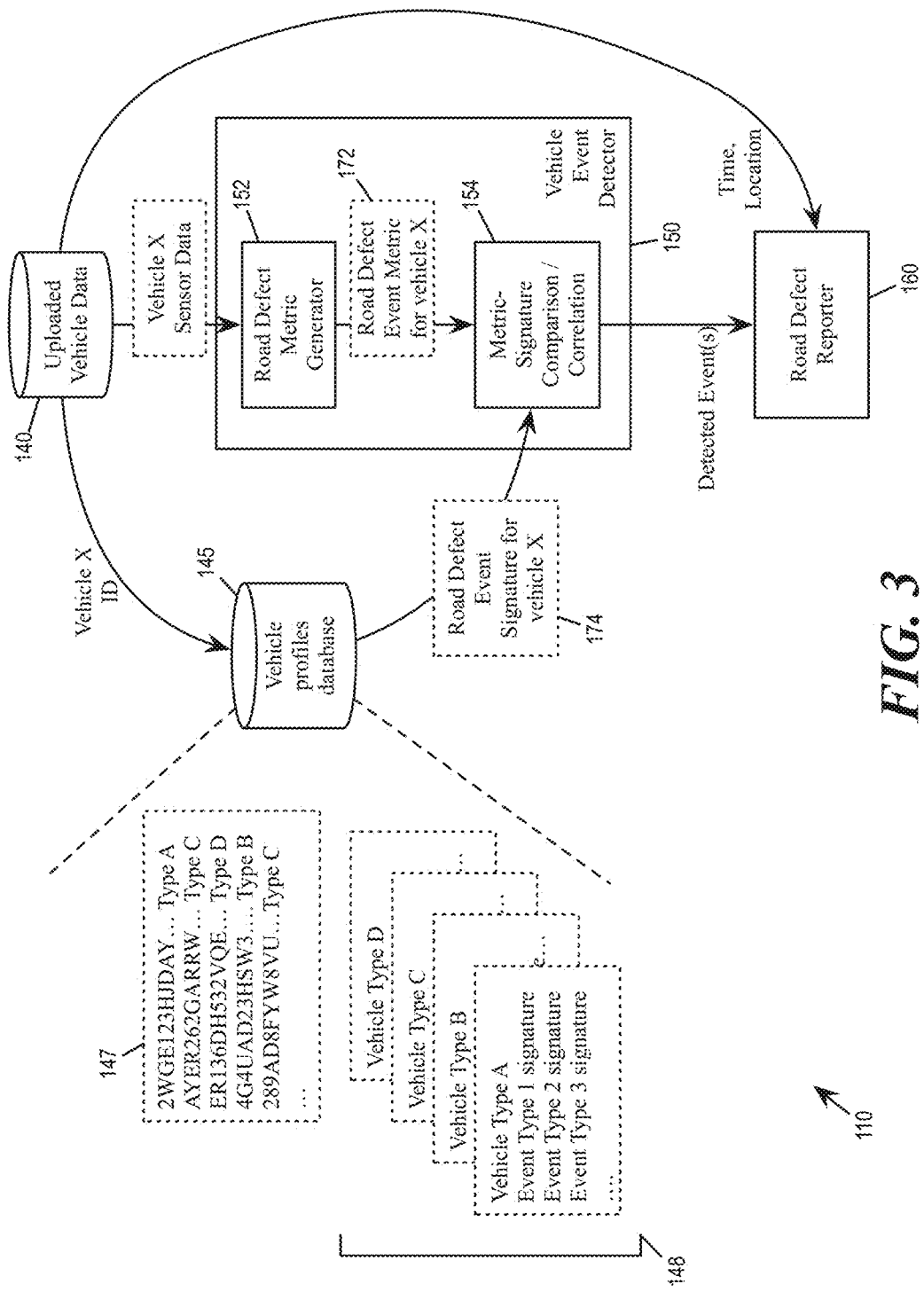
FIG. 3 illustrates the analysis of sensor data performed centrally at the cloud datacenter of a cloud detection system.

FIG. 3 illustrates the analysis of sensor data performed centrally at the cloud datacenter of a cloud detection system. Specifically, the FIG. illustrates the data flow in the cloud detection system 100 when the cloud datacenter 110 is performing road surface defect detection based on the sensor data uploaded by a particular vehicle ("vehicle X"). As illustrated, the vehicle event detector 150 receives vehicle sensor data (i.e., the position and motion data) uploaded by vehicle X from the upload vehicle data storage 140 and informs the road defect reporter 160 of the road defects that are detected. The vehicle event detector 150 performs its detection by retrieving the profile of vehicle X from the vehicle profiles database 145 by using the identifier of vehicle X as key.

As illustrated in FIG. 1 above, the vehicle event detection module 150 factors in vehicle profile provided by a vehicle profiles database 145 when using uploaded sensor data to detect road surface defects. In some embodiments, the profiles of the vehicles are uploaded from the vehicles themselves. The profiles of the vehicles in the database 145 may also be supplied from other sources, such as manufactures of the vehicles. When using the uploaded position and motion data to detect and identify events encountered by the vehicle, the cloud datacenter 110 uses the vehicle ID supplied by the vehicle 121 to retrieve its corresponding vehicle profile from the database 145. In some embodiments, such database is indexed by vehicle IDs so that the cloud datacenter 110 can retrieve and use a vehicle's profile by using the vehicle's ID as key.

In order to detect a road surface defect by monitoring uploaded sensor data, the cloud datacenter computes a road defect event metric from the uploaded sensor data, e.g., vehicle acceleration, vehicle speed, tire pressure, wheel angular velocity, and wheel angular acceleration, etc. The cloud datacenter compares the computed road defect event metric with a road surface defect signature to determine if there is a match or if the difference between the metric and the signature is within certain threshold. A match between the computed metric and the signature indicates to the cloud detection system 110 that a road surface defect is detected.

As illustrated in FIG. 3, the vehicle event detector 150 includes a road defect metric generator 152 and a metric-signature comparison or correlation module 154. The metric generator 152 is configured to generate a road defect event metric 172 while the metric-signature comparison correlation module is configured to correlate and/or compare the computed road defect event metric 172 with a road defect event signature 174.

As mentioned, vehicles with different profiles respond differently to the same road surface defect, and that the detection of road defect based on uploaded data from a vehicle factors in the profile of the vehicle. In some embodiments, the vehicle event detector 150 normalize the comparison operation between the road surface defect metric and the road surface defect signature with respect to the vehicle's profile. In some embodiments, the computed road surface defect metric is a normalized metric that is normalized with respect to a hypothetical normal vehicle having a set of normalized characteristics, e.g., normalized weight, normalized tire pressure, normalized footprint, etc. The road defect signature is computed for the hypothetical normal vehicle so that the comparison is between normalized signature and normalized metric.

In some embodiments, instead of normalizing the road defect event metric, the cloud detection system uses vehicle-specific road defect signatures to detect road surface defects. The vehicle-specific signature is compared/correlated with the road defect metric of the vehicle to identify road defect events encountered by the vehicle. As illustrated, the road defect metric generator 152 receives sensor data for a particular vehicle ("vehicle X") and generates road defect event metric 172 (not normalized). The metric-signature comparison/correlation module 154 receives the generated metric 172 and compares it with the road defect event signature 174 provided by the vehicle profiles database 145. This road defect event signature 174 is generated for vehicle X based on the profiles of vehicle X. The metric-signature comparator 154 then produces an indication of detected road surface defect based on the comparison between the vehicle-specific metric and the vehicle-specific signature. In some embodiments, the indication of the detected road surface defect is a signal or a stored flag that is relayed to the road defect reporter 160.

As illustrated, the cloud datacenter 110 retrieves the vehicle-specific signature from the vehicle profiles database 145 by using the identifier of the vehicle as key. In some embodiments, the vehicle profiles are organized according to vehicle types so that the cloud datacenter need not maintain a separate profile for each vehicle. Vehicles belonging to a same type have similar characteristics that result in similar defect event metrics and similar defect event signatures, and the vehicle profile database 145 maintains distinct signatures for different types of vehicles rather than for individual vehicles. In some embodiments, the vehicle profile database 145 includes a first lookup table 147 for mapping vehicle IDs to vehicle types and a second lookup table 148 for mapping vehicle types to a set of road defect event signatures. The look up tables 147 and 148 allow the vehicle profile database to produce a vehicle profile or a set of vehicle-specific road defect signatures in response to a query based on a vehicle identifier.

In some embodiments, for each vehicle type, the cloud detection system provides a set of signatures that corresponds to different types road defect events. As illustrated in FIG. 3, for each vehicle type, the cloud datacenter 110 provides different signatures for different types of road defects (signatures for event types 1, 2, 3, etc.,) at the lookup table 148 of the vehicle profiles database 145.

In some embodiments, for a particular type of vehicle, a signature of a particular type of road defect is derived by applying a model of the type of defect as well as a model of the particular type of vehicle (based on the vehicle profile). Such a signature can be a single value or a set or an array of values. The signature represents or summarizes the predicted sensor data of the vehicle when encountering the particular type of road defect. For example, in some embodiments, the cloud detection system provides a signature for detecting potholes for a particular vehicle type by computing a set of predicted sensor output for when a vehicle of the type encounters a pothole. Such a signature is for matching spikes in tire pressure, where the magnitude of the spike (normalized with respect to speed of the vehicle) is determined by the weight and nominal tire pressure of the type of vehicles. As another example, in some embodiments, the cloud detection system provides a signature for detecting an icy patch by a particular vehicle type by computing a set of predicted sensor output for when a vehicle of the type encounters an icy patch. Such a signature would be for identifying differences in angular speed and acceleration between different tires or wheels.

Figure 4:
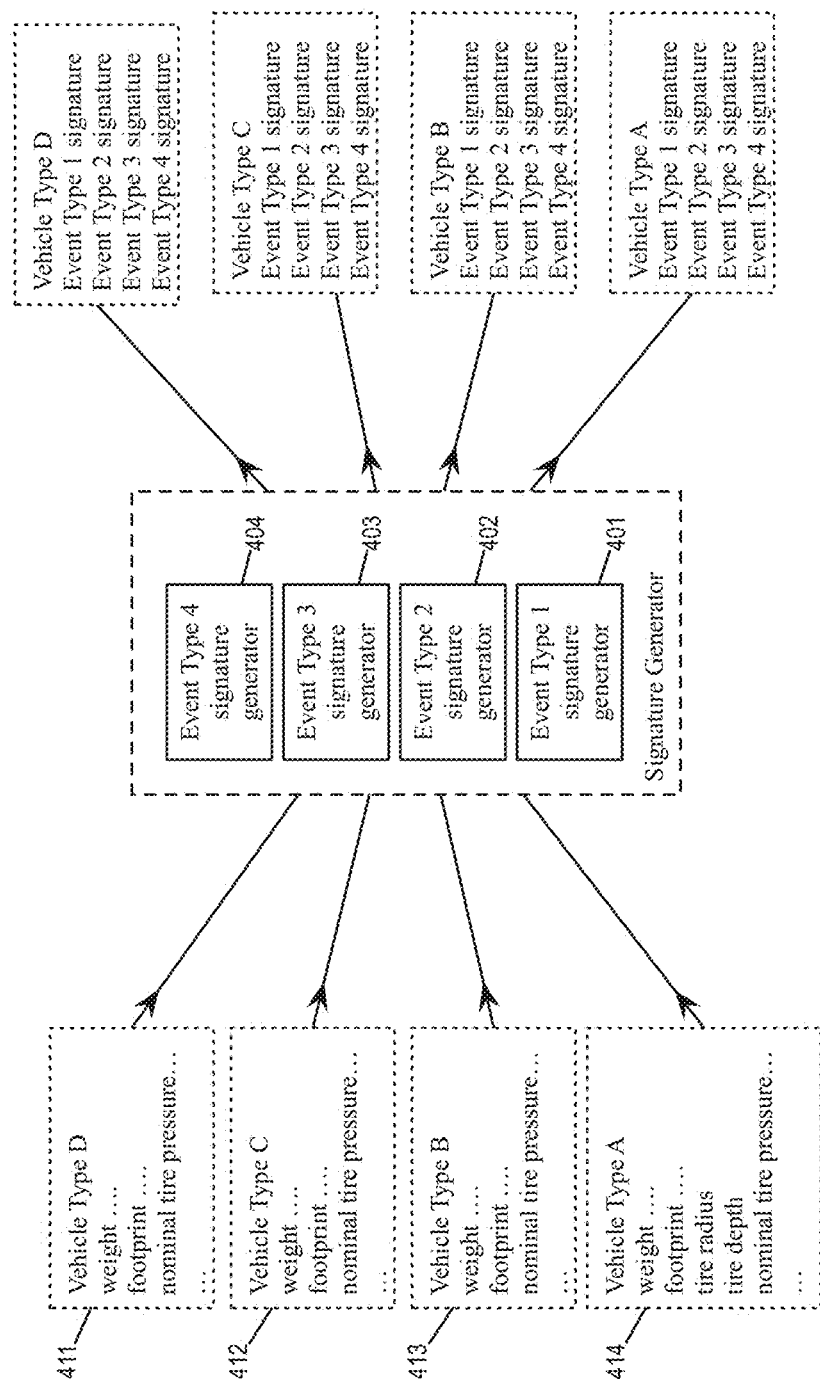
FIG. 4 illustrates the generation of signatures for different types of road defects for different types of vehicles having different sets of vehicle profiles.

FIG. 4 illustrates the generation of signatures for different types of road defects for different types of vehicles having different sets of vehicle profiles. The content of each vehicle profile is used to generate a set of signatures for various road defect events based on that vehicle profile. As illustrated, vehicle characteristics in a vehicle profile that are used to generate defect event signatures include the weight of the vehicle, the footprint of the vehicle, nominal pressure of each tire, depth of each tire, etc. FIG. 4 shows signature generators 401-404 for generating signatures for road defect events types 1, 2, 3, and 4, respectively. Each of the signature generators 401-404 uses the vehicle characteristics of each vehicle profile to generate a road defect event signature for the type of vehicles having that profile.

In some embodiments, the generated signatures are stored in the vehicle profiles database 145. The cloud datacenter (at e.g., the vehicle event detector 150), when monitoring the uploaded sensor data of a vehicle, uses the vehicle's ID to retrieve the corresponding road defect event signatures stored in the database 145. In some embodiments, the cloud datacenter 110 computes the signatures for the different types of hazard for different types of vehicles ahead of any real-time operations of the cloud detection system 100. In some embodiments, the computation of signatures for the different vehicles are performed elsewhere (e.g., by vehicle manufacturers) and provided to the cloud detection system 100.

In some embodiments, the cloud datacenter correlates the uploaded sensor data of each vehicle against the signatures generated for the corresponding vehicle type to detect different types of road defects (potholes, bumps, icy patches, flood, etc.) For each vehicle, the cloud datacenter generates different road defect event metrics for different types of road defects. These metrics for the different types of road defects are then compared/correlated with the signatures of the different types of road defects.

Figure 5:
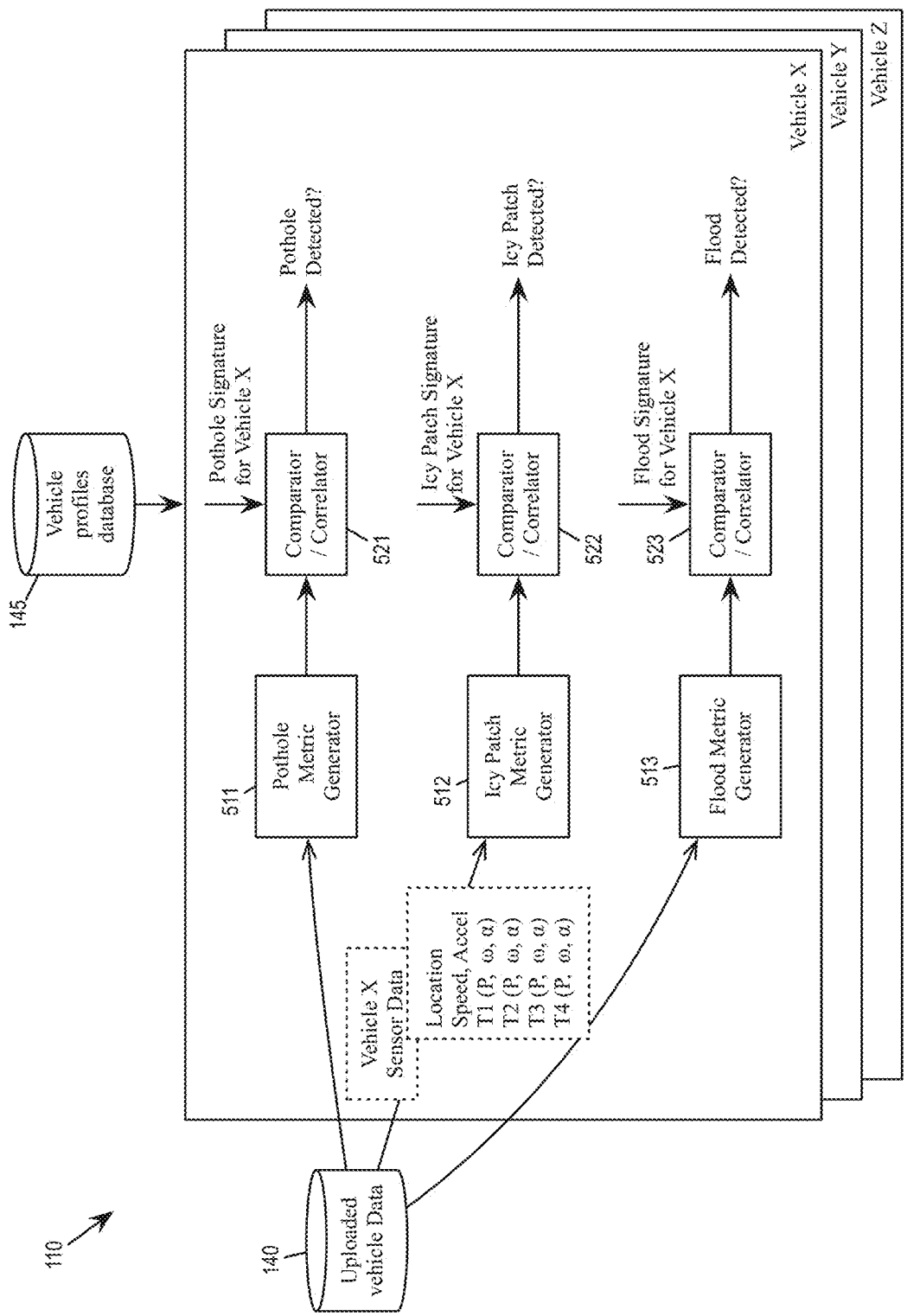
FIG. 5 illustrates the detection of different types of road defects by comparing metrics computed from uploaded sensor data with signatures computed from vehicle profiles.

FIG. 5 illustrates the detection of different types of road defects by comparing metrics computed from uploaded sensor data with signatures computed from vehicle profiles. FIG. 5 illustrates the detection of road defects based on sensor (motion and position) data uploaded by three different vehicles X, Y, and Z.

As illustrated, the vehicle event detector 150 receives data from the uploaded vehicle data storage 140, which includes uploaded sensor (motion and position) data for the vehicles X, Y, and Z. For each vehicle's uploaded sensor data, the cloud datacenter generates road defect event metrics for several types of road defects, including pothole, ice, and flood. These metrics are computed from the vehicle's sensor data, which includes the vehicle's speed, acceleration, as well as the tire pressure (P), velocity (w), and acceleration (a) of each wheel (T1-T4). The metric may also be computed from data from other types of sensors, such as video image from an onboard camera, a braking system, and a stability control system of the vehicle.

For each road defect, a metric generator (such as one of the generators 511-513) generates a metric for that road defect and provide the generated metric to a metric-signature comparator or correlator (such as one of the comparators 521-523) of the road defect. The comparator or correlator compares the generated metric with the signature of that type of road defect and determines whether that type of road defect has been detected. The vehicle event detector retrieves the signatures for vehicle X from the vehicle profiles database 145.

Though not illustrated, the vehicle event detector 150 likewise performs road surface defect detection based on the uploaded sensor data of vehicles Y and Z. For example, the vehicle event detector 150 uses the uploaded sensor data of vehicle Y to generate defect event metrics for detecting potholes, icy patches, and flood conditions. These metrics are then compared/correlated with their corresponding signatures computed from the profile of vehicle Y.

The road surface defect events detected by the vehicle event detector 150 are reported to the event reporter 160, which in turn provides road hazard reports to subscribing vehicles and notifications to road repair crews based on the positions of the detected road surface defects. In some embodiments, information on road defects from vehicles traveling a particular road is communicated to subsequent vehicles traveling the same road to warn them of road hazard conditions.

In some embodiments, the cloud datacenter uses the position and motion data uploaded from multiple vehicles to detect road defects that are not readily apparent by examining the motion and position data of a single vehicle. For example, one vehicle stopping or swerving around an obstruction (e.g., a disabled vehicle or a fallen tree) can be detected by the cloud datacenter by monitoring changes in the vehicle's speed, acceleration and GPS location, but such changes may or may not be indicative of an actual obstruction on the road. However, if sufficient number of vehicles performed similar avoidance maneuvers near the same location, the cloud datacenter would report the presence of the road obstruction at the location.

In some embodiments, in order to minimize false-positives and to improve the accuracy of road defect detection and reporting, the event reporter 160 reports a location as having a particular type of road surface defect only if there is a sufficient number of detected events at that location. In other words, detected road surface defect events from different vehicles are aggregated to determine which location has a particular type of defect.

Figure 6:
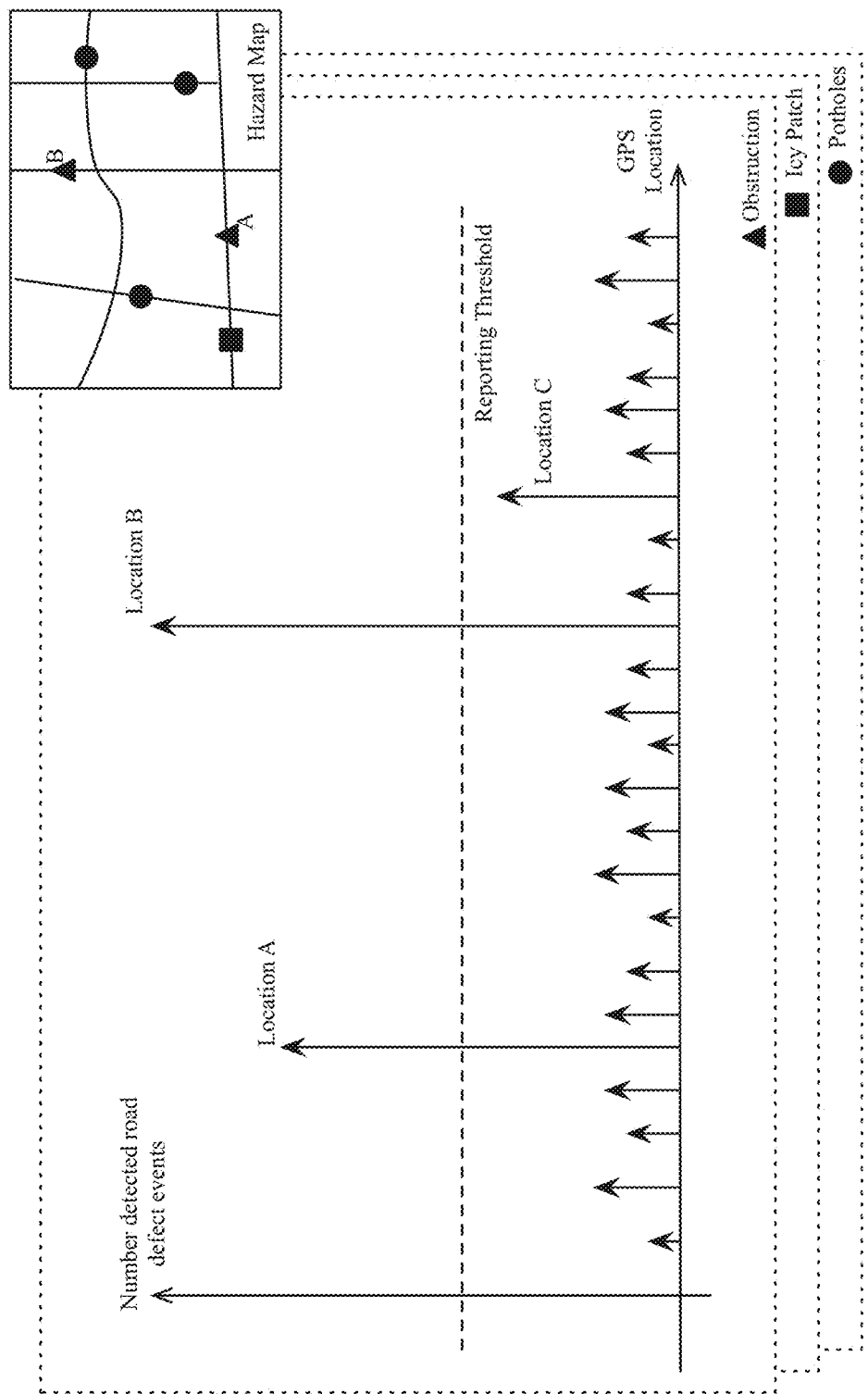
FIG. 6 conceptually illustrates the aggregation of detected events for reporting road surface defects.

FIG. 6 conceptually illustrates the aggregation of detected events for reporting road surface defects. FIG. 6 illustrates that, for each type of road surface defect (obstruction, potholes, icy patch), the road defect reporter 160 records the number of detected events for each location. The reporter 160 imposes a criteria including that only locations with a number of detected events exceeding a threshold are reported as having the defect. In the example illustrated in FIG. 6, the number of obstruction detection events at locations A and B exceeds a threshold, while the number of obstruction detection events at other locations (including location C) do not exceed the threshold. Consequently, the reporter 160 when reporting obstructions as hazard warnings or as road repair requests report locations A and B, but not for other locations.

Figure 7:
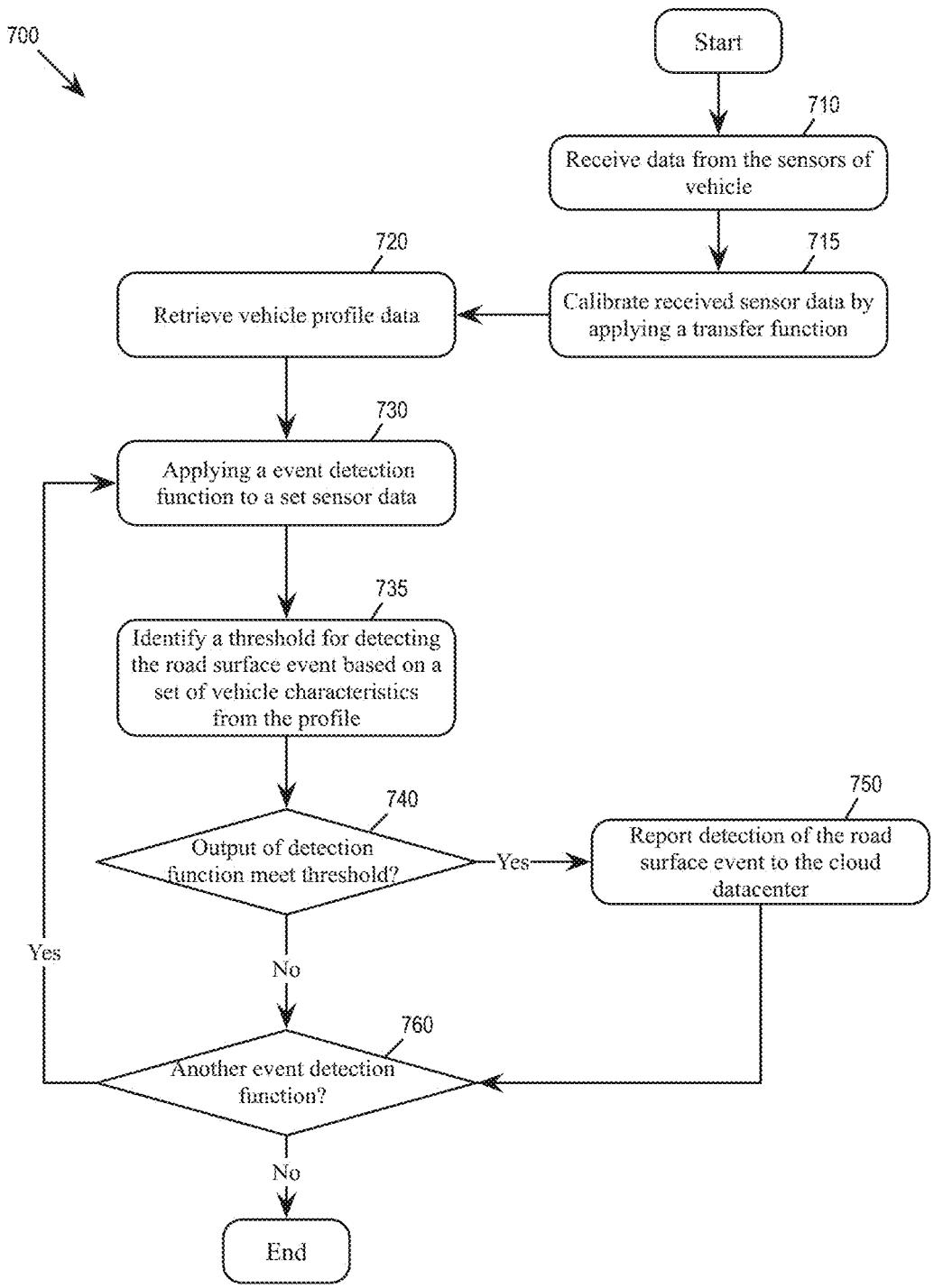
FIG. 7 conceptually illustrates a process for detecting road surface event based on sensor data (motion and position data) locally at a vehicle.

FIG. 7 conceptually illustrates a process 700 for detecting a road surface defect event based on sensor data (motion and position data) locally at a vehicle. In some embodiments, one or more computing devices aboard a vehicle (such as the vehicle 121) perform the process 700 when participating in the cloud detection system. In some embodiments, the vehicle executes multiple copies/instances of the process 700 at one or more processing units.

The process 700 starts by receiving (at 710) data from sensors of the vehicle (e.g., GPS data, speedometer reading, accelerometer reading, tire pressure readings, wheel angular velocity, stability control system, video recording, etc.). The process receives data from the vehicle's sensors continuously or periodically in order to monitor road surface events. Examples of the road surface defect detection that is performed locally at a vehicle are described above with reference to FIG. 2.

The process calibrates (at 715) the received sensor data by applying a transfer function. The transfer function is adaptively configured to remove effects of the vehicle's peculiarities (e.g., defect, damages) on its sensor data. The process then retrieves (at 720) vehicle profile data regarding various characteristics of the vehicle, characteristics such as weight of the vehicle, the tire positions of the vehicle (footprint), average/nominal tire pressures of the vehicle, tire dimensions (such as depth and thickness), as well as other information, such as the type of the suspension system.

The process applies (at 730) an event detection function (e.g., detection functions 221-223) for road surface event to a set of sensor data (e.g., tire pressure and acceleration data for detecting potholes). The process also identifies (at 735) criteria for the detecting the road surface event based on a set of vehicle characteristics retrieved from the profile. Such criteria require sensor data or outputs of functions based the sensor data to meet a certain threshold value or be within a threshold range of a target value. The process determines (at 740) whether the output of the detection function meets the threshold. If so, the process proceeds to 750. If the output of the detection function does not meet the identified threshold, the process proceeds to 760.

At 750, the process (i.e., the vehicle) reports the detected road surface event by uploading it to the cloud datacenter. Next, the process determines (at 760) if there is another event detection function to be performed. If so, the process returns to 730; otherwise, the process 700 ends.

Figure 8:
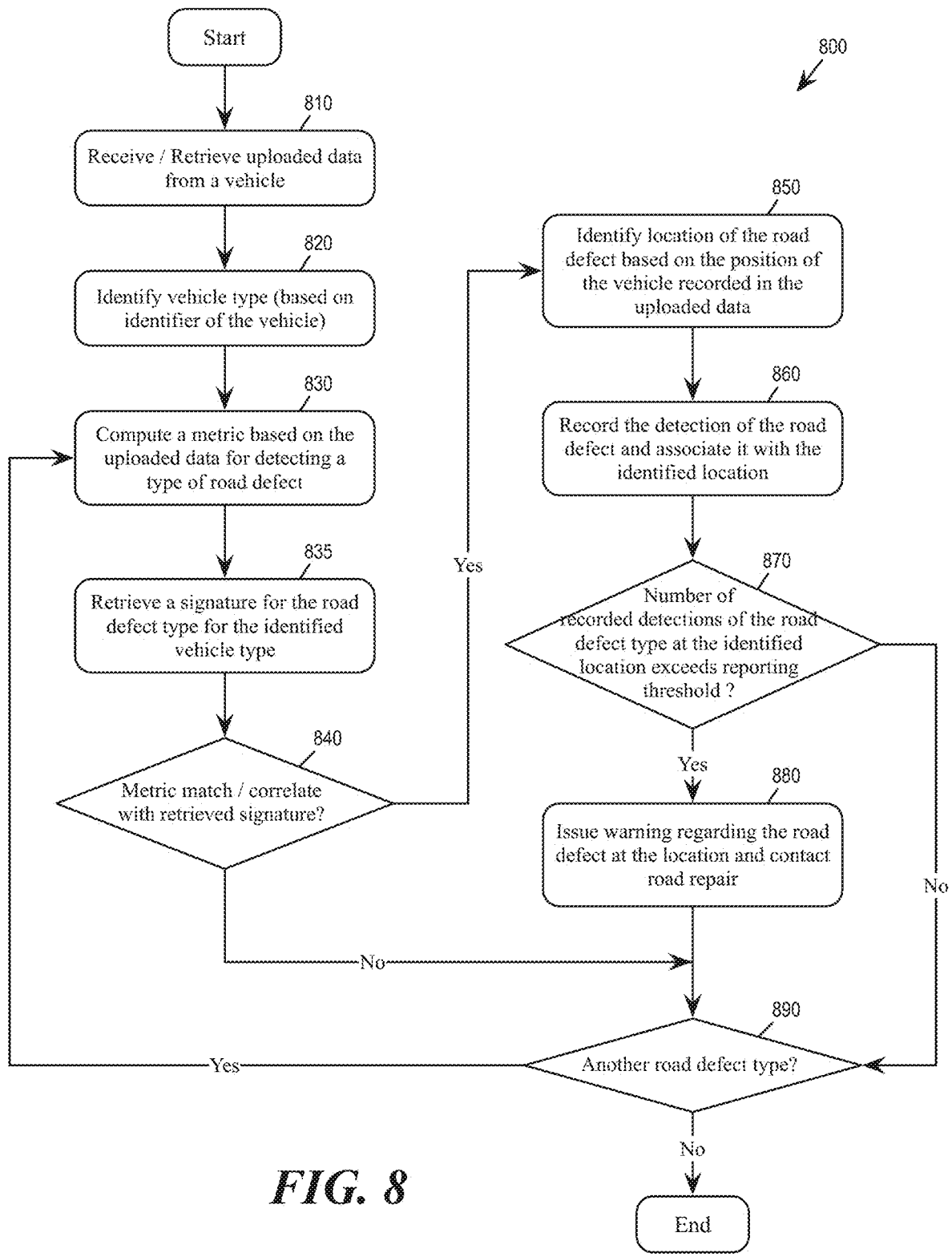
FIG. 8 conceptually illustrates a process for detecting a road surface defect based on sensor data uploaded from vehicles, consistent with some embodiments of the disclosure.

FIG. 8 conceptually illustrates a process 800 for detecting road surface defects based on sensor data (motion and position data) uploaded from vehicles. The cloud datacenter of a cloud detection system performs the process 800 to detect and report road surface defects. In some embodiments, the cloud datacenter executes multiple copies/instances of the process 800 at one or more processing units. In some embodiments, each instance of the process 800 is performed for detecting road surface defects based on uploaded data of one vehicle. In some embodiments, several instances of the process 800 are performed in parallel at different processing units for several different vehicles.

The process 800 starts by receiving (at 810) uploaded data from a particular vehicle. The cloud data center receives uploaded data from the vehicle continuously in order to continuously detect road surface defects. This uploaded data includes sensor data or position and motion data of the vehicle (e.g., GPS data, speedometer reading, accelerometer reading, tire pressure readings, wheel angular velocity, stability control system, video recording, etc.). The uploaded data also includes an identifier of the vehicle. The uploaded data may also include the road surface event detected by individual vehicles. The process then identifies (at 820) the vehicle type that the particular vehicle belongs to, based on the identifier of the vehicle.

The process computes (at 830) a metric based on the uploaded data of the particular vehicle for detecting a type of road defect (e.g., potholes, icy patches, flood areas, etc.) The process retrieves (at 835) a signature for detecting the type of road defect. Metrics and signatures of road defects are described above by reference to FIGS. 3-4.

The process compares/correlates the computed metric with the retrieved signature and determines (at 840) whether there is a match. If the computed metric matches the retrieved signature (or if the difference is within a threshold range), the process proceeds to 850. If the computed metric does not match the retrieved signature, the process proceeds to 890.

At 850, the process identifies the location of the road defect based on the position of the vehicle recorded in the upload data. This position is based on the GPS position data recorded by the vehicle when it encounters the detected road defect. In other words, this is the position data associated with the portion of the uploaded sensor data that produces the matching metric. The process records (at 860) the detection of the road defect and associates the recorded defect with the identified location.

The process determines (at 870) whether the number of recorded detections of the road defect type at the identified location exceeds reporting threshold. If so, the process proceeds to 880. If the number of recorded detections for the identified location does not exceed threshold, the process proceeds to 890.

At 880, the process issues warnings regarding the road defect at the identified location and contact road repair based on the road defect. The process determines (at 890) whether there is another road defect type for which the cloud system has the signature to detect. If so, the process returns to 830 to detect that type of road defect. Otherwise the process 800 ends. In some embodiments, the process returns to 810 to perform road defect detection based on uploaded data from another vehicle.

The cloud datacenter 110 also generates information or services for other interested parties based on the uploaded sensor data or detected road surface defects. The cloud data center 110 provide a service to road maintenance companies by the monitoring of vehicle road surface information. This information may be correlated to physics based models of road degradation such as freeze/thaw cycles, vehicle weights, or vehicle traffic to determine the durability of the road. In some embodiments, the cloud data center provides a service to vehicle manufacturers to monitor the impacts to the vehicle and recommend service to reduce the probability of vehicle failures. The automotive manufacturers can notify the vehicle owner that service is needed based upon detecting changes in the vehicle performance. Since a vehicle manufacturer integrates many supplier subcomponents in the manufacture of vehicles, the data collected from vehicles encountering road hazards can provide the manufacturer with information on the supplier component reliability. For example, if the collected data indicates that wheel rims are bending at low impact, the manufacturer may notify the supplier to improve the design.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
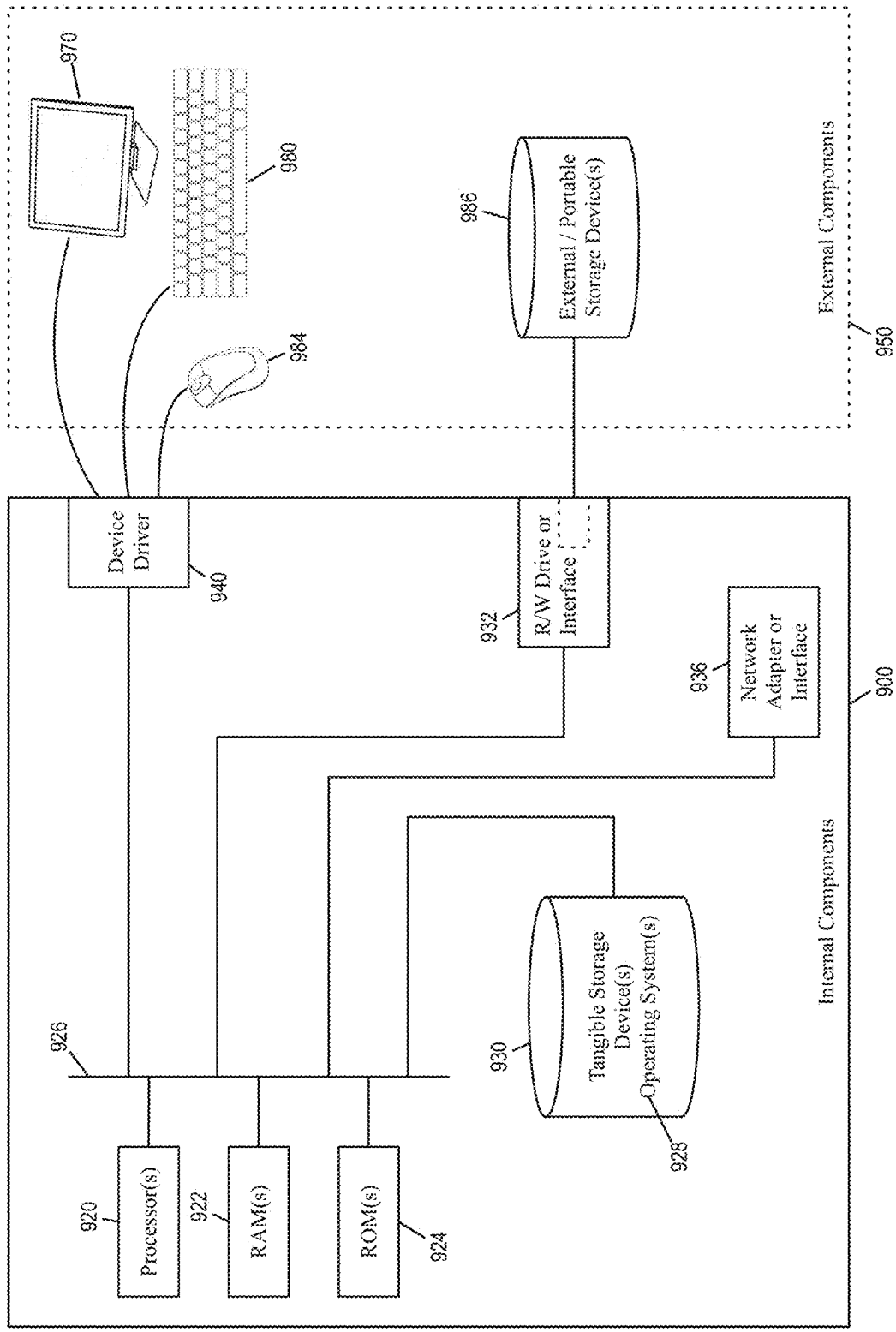
FIG. 9 shows a block diagram of the components of a data processing system in accordance with an illustrative embodiment of the present disclosure.

FIG. 9 shows a block diagram of the components of a data processing system 900 and 950 that may be included within a vehicle (e.g., 121) or the cloud datacenter 110 of the cloud detection system in accordance with an illustrative embodiment of the present disclosure. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 900, 950 is representative of any electronic device capable of executing machine-readable program instructions. Data processing system 900, 950 may be representative of a smart phone, a computer system, PDA, or other electronic devices. Examples of computing systems, environments, and/or configurations that may represented by data processing system 900, 950 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing system 900, 950 may include a set of internal components 900 and a set of external components 950 illustrated in FIG. 9. The set of internal components 900 includes one or more processors 920, one or more computer-readable RAMs 922 and one or more computer-readable ROMs 924 on one or more buses 926, and one or more operating systems 928 and one or more computer-readable tangible storage devices 930. The one or more operating systems 928 and programs such as the programs for executing the processes 700 and/or 800 are stored on one or more computer-readable tangible storage devices 930 for execution by one or more processors 920 via one or more RAMs 922 (which typically include cache memory). In the embodiment illustrated in FIG. 9, each of the computer-readable tangible storage devices 930 is a magnetic disk storage device of an internal hard drive. Alternatively, each of the computer-readable tangible storage devices 930 is a semiconductor storage device such as ROM 924, EPROM, flash memory or any other computer-readable tangible storage device that can store a computer program and digital information.

The set of internal components 900 also includes a R/W drive or interface 932 to read from and write to one or more portable computer-readable tangible storage devices 986 such as a CD-ROM, DVD, memory stick, magnetic tape, magnetic disk, optical disk or semiconductor storage device. The instructions for executing the processes 700 or 800 can be stored on one or more of the respective portable computer-readable tangible storage devices 986, read via the respective R/W drive or interface 932 and loaded into the respective hard drive 930.

The set of internal components 900 may also include network adapters (or switch port cards) or interfaces 936 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 936. From the network adapters (or switch port adaptors) or interfaces 936, the instructions and data of the described programs or processes are loaded into the respective hard drive 930. The network may comprise copper wires, optical fibers, wireless transmission, routers, firewalls, switches, gateway computers and/or edge servers.

The set of external components 950 can include a computer display monitor 970, a keyboard 980, and a computer mouse 984. The set of external components 950 can also include touch screens, virtual keyboards, touch pads, pointing devices, and other human interface devices. The set of internal components 900 also includes device drivers 940 to interface to computer display monitor 970, keyboard 980 and computer mouse 984. The device drivers 940, R/W drive or interface 932 and network adapter or interface 936 comprise hardware and software (stored in storage device 930 and/or ROM 924).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
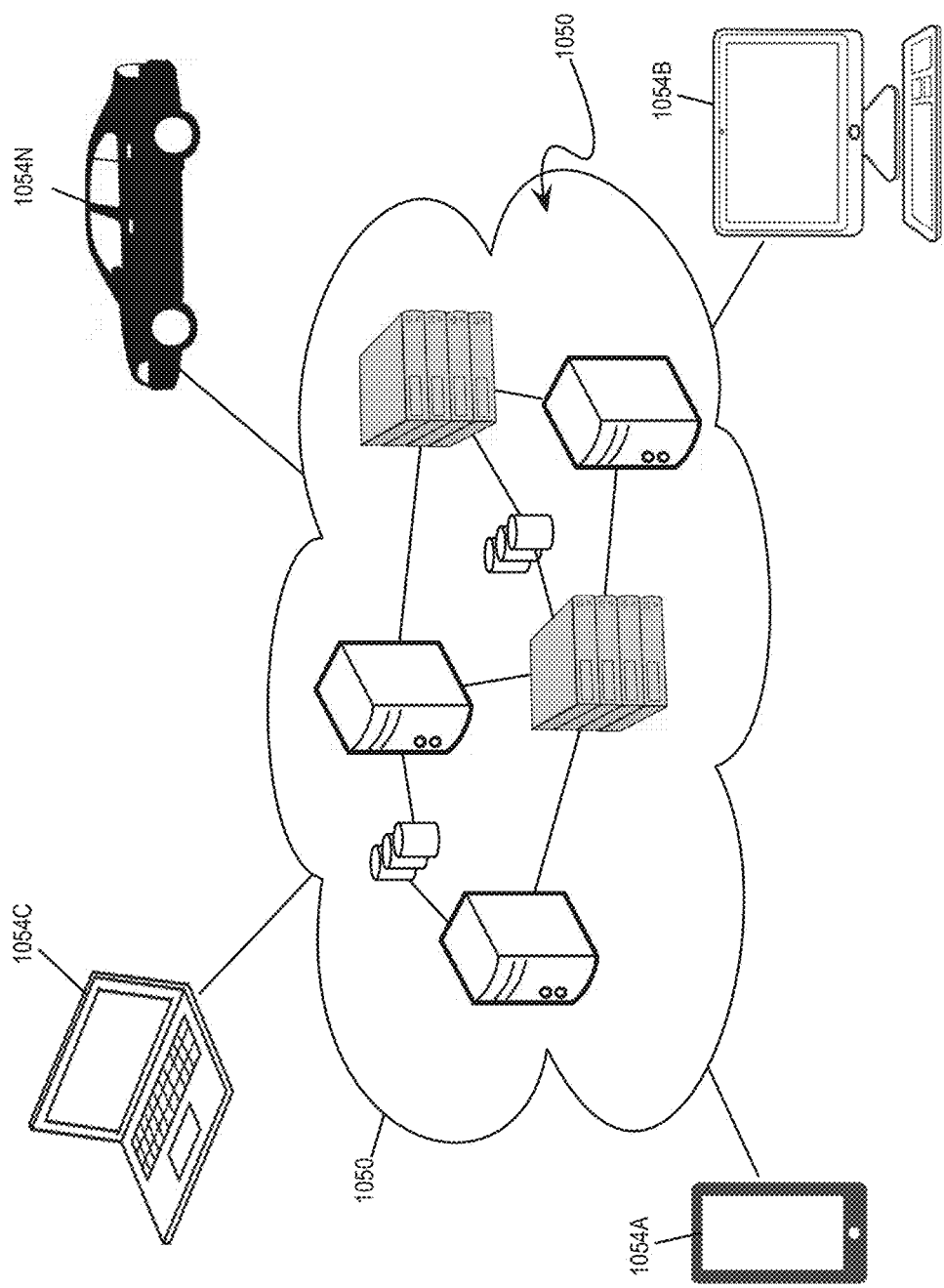
FIG. 10 illustrates a cloud computing environment.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
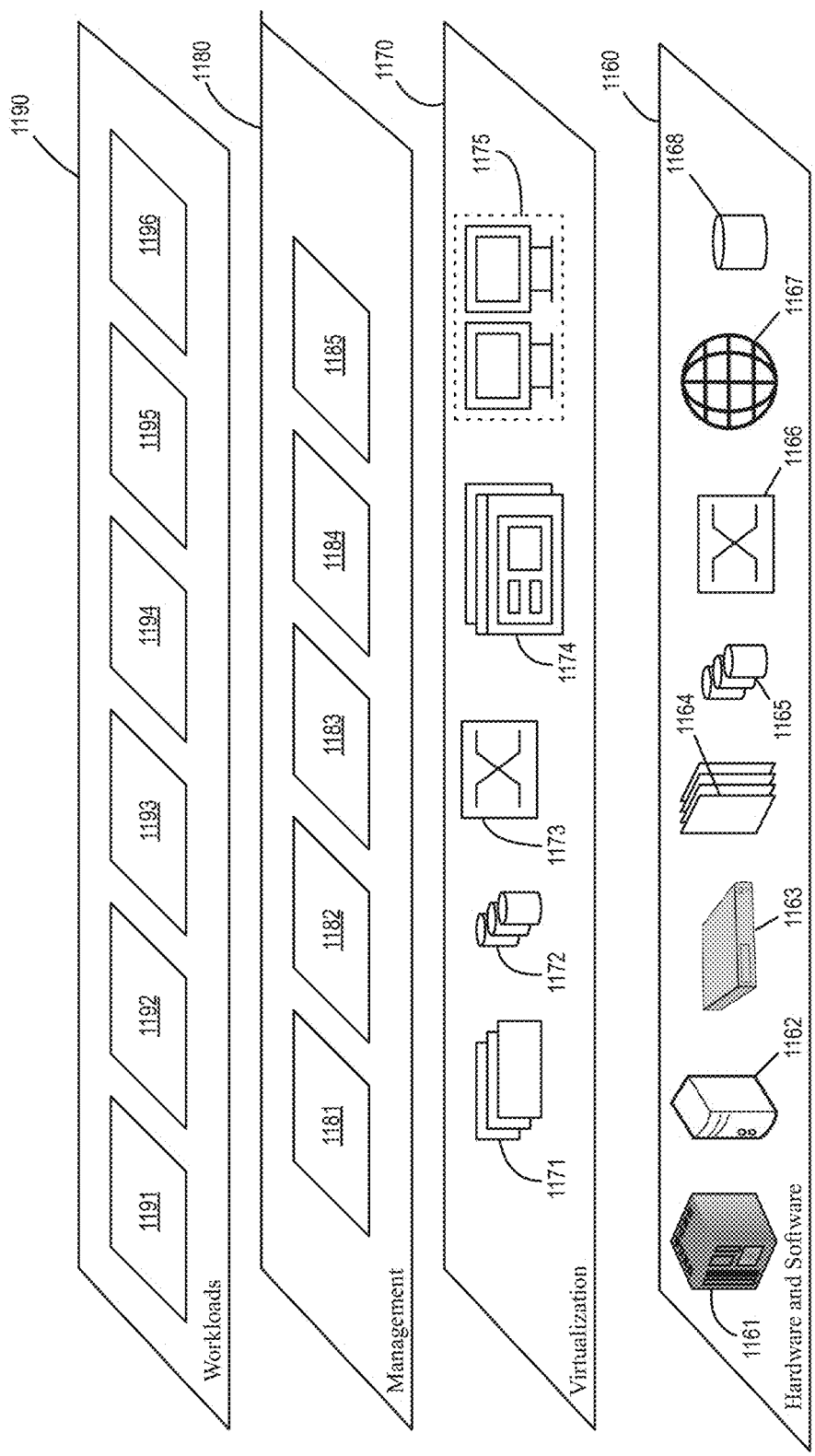
FIG. 11 illustrates a set of functional abstraction layers provided by a cloud computing environment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud-computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and road defect detection 1196. In some embodiments, the road defect detection workload 1196 performs the functions of the road defect detector 150 and the road defect reporter 160 of the cloud detection system 100 as described above, i.e., to detect or identify road surface defect based on sensor data or motion and position data uploaded by vehicles on the road.

The foregoing one or more embodiments facilitate the detection of road surface defect within a computer infrastructure by having one or more computing devices receiving sensor data or motion and position information from many vehicles. The computer infrastructure is then used to analyze the received information to detect and report road surface defects.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of determining road surface defects, comprising:
   receiving motion, position, and stability control system information from a plurality of vehicles by a data center;
   retrieving a profile for a hypothetical normal vehicle from a database of vehicle profiles by the data center;
   identifying one or more criteria for detecting a particular type of road surface defect from different types of road surface defects based on the retrieved profile of the hypothetical normal vehicle, by the data center;
   retrieving, by the data center, video information from a vehicle of the plurality of vehicles only upon determining that the motion and received position and stability control system information satisfies the identified criteria, thereby reducing an amount of video data received and stored by the data center; and
   upon determining by the data center that the motion and received position and stability control system information satisfies the identified criteria, reporting a detection of a road surface defect of the particular type as well as a video of the road surface defect based on the video data and a location associated with the detected road surface defect based on the received position information.

2. The method of claim 1, wherein, for each of the plurality of vehicles, the received motion information of the vehicle comprises a plurality of sets of sensor data, each set of sensor data associated with a different wheel or tire of the vehicle.

3. The method of claim 2, wherein a set of sensor data associated with a tire comprises tire pressure.

4. The method of claim 3, wherein the retrieved profile of the hypothetical normal vehicle comprises a weight associated with the hypothetical normal vehicle.

5. The method of claim 4, wherein the particular type of road surface defect is a pothole and the criteria is a threshold tire pressure that is determined based on the weight associated with a corresponding vehicle.

6. The method of claim 5, wherein the retrieved profile of the hypothetical normal vehicle further comprises a dimension of a tire of the hypothetical normal vehicle, wherein the threshold tire pressure is further based on the dimension of the tire.

7. The method of claim 1, further comprising reporting a road obstruction upon determining that more than a threshold number of vehicles report motion and position data indicative of a road obstruction at a same location.

8. The method of claim 1, further comprising identifying a service agency based on the detected event and notifying the identified service agency.

9. The method of claim 1, wherein the retrieved profile comprises one or more signatures of an expected response of a vehicle of the plurality of vehicles due to the particular type of road surface defect, wherein the identified criteria includes a metric computed based on the received motion and position data to match the signature.

10. The method of claim 1, wherein the received motion information of a vehicle of the plurality of vehicles comprises events detected by the vehicle based on an analysis of sensor data produced at the vehicle.

11. The method of claim 1, further comprising receiving video information from each vehicle of the plurality of vehicles that has triggered a recording function of the corresponding vehicle's camera based on sensors of the corresponding vehicle exceeding a predetermined threshold.

12. A computing device comprising:
   a processor at a data center;
   a network interface coupled to the processor;
   a storage device storing a set of instructions, wherein an execution of the set of instructions by the processor configures the computing device to perform acts comprising:
      collecting data from a set of sensors of a vehicle;
      retrieving a profile for a hypothetical normal vehicle;
      identifying one or more criteria for detecting a particular type of road surface defect from different types of road surface defects based on the retrieved profile of the hypothetical normal vehicle;
      the data center retrieving video information from a vehicle of the plurality of vehicles only upon determining that the motion and received position and stability control system information satisfies the identified criteria, thereby reducing an amount of video data received and stored by the data center; and
      upon determining by the data center that the collected sensor data satisfies identified criteria, reporting a detection of a road surface defect of the particular type as well as a video of the road surface defect based on the video data and a location associated with the detected road surface defect, based on the received position information.

13. The computing device of claim 12, wherein the collected data of the vehicle comprises a plurality of sets of sensor data, each set of sensor data associated with a different wheel or tire of the vehicle.

14. The computing device of claim 13, wherein a set of sensor data associated with a tire comprises a tire pressure.

15. The computing device of claim 14, wherein the retrieved profile of the hypothetical normal vehicle comprises a weight of the vehicle.

16. The computing device of claim 15, wherein the particular type of road surface defect is a pothole and the criteria is a threshold tire pressure that is determined based on the weight of a corresponding vehicle.

17. The computing device of claim 16:
   wherein the retrieved profile of the vehicle further comprises a dimension of a tire of the vehicle, and
   wherein the threshold tire pressure is further based on the dimension of the tire.

18. The computing device of claim 12, wherein the collected sensor data is calibrated by a transfer function to eliminate an effect of characteristics of the vehicle that deviate from the retrieved profile of the hypothetical normal vehicle.

19. The computing device of claim 12:
   wherein the collected sensor data comprises vibration data of the vehicle's tires, and
   wherein the execution of the set of instructions by the processor further configures the computing device to perform acts comprising: reporting a detection of a road surface defect upon determining a change in the vibration data of one of the vehicle's tires.

20. The computing device of claim 12:
   wherein the collected sensor data comprises steering data, and
   wherein the execution of the set of instructions by the processor further configures the computing device to perform acts comprising: reporting a detection of road surface defect when the steering data indicate a sudden change in alignment.

* * * * *